US009875309B2

(12) United States Patent
Christensen et al.

(10) Patent No.: US 9,875,309 B2
(45) Date of Patent: *Jan. 23, 2018

(54) TOPICAL SEARCH SYSTEM

(71) Applicant: Flipboard, Inc., Palo Alto, CA (US)

(72) Inventors: Jens Bagger Christensen, Menlo Park, CA (US); Arthur Anthonie van Hoff, Menlo Park, CA (US)

(73) Assignee: Flipboard, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/428,408

(22) Filed: Feb. 9, 2017

(65) Prior Publication Data

US 2017/0154117 A1    Jun. 1, 2017

Related U.S. Application Data

(63) Continuation of application No. 14/666,274, filed on Mar. 23, 2015, now Pat. No. 9,607,047, which is a continuation of application No. 12/896,700, filed on Oct. 1, 2010, now Pat. No. 8,990,200.

(60) Provisional application No. 61/248,015, filed on Oct. 2, 2009.

(51) Int. Cl.
*G06F 7/00* (2006.01)
*G06F 17/30* (2006.01)
*G06F 7/08* (2006.01)

(52) U.S. Cl.
CPC ......... *G06F 17/30867* (2013.01); *G06F 7/08* (2013.01); *G06F 17/30684* (2013.01); *G06F 17/30719* (2013.01)

(58) Field of Classification Search
CPC ...... G06F 17/30; G06F 7/08; G06F 17/30867; G06F 17/30684; G06F 17/30719; G06Q 30/02; G06Q 30/0256; G06Q 30/0273; G06Q 30/0277
See application file for complete search history.

(56) References Cited

U.S. PATENT DOCUMENTS

| | | | |
|---|---|---|---|
| 5,257,186 A | 10/1993 | Ukita et al. | |
| 7,313,523 B1 * | 12/2007 | Bellegarda | G10L 13/033 704/257 |
| 7,783,622 B1 | 8/2010 | Vandermolen et al. | |
| 7,783,662 B2 * | 8/2010 | Johnson | G06F 21/554 707/781 |

(Continued)

OTHER PUBLICATIONS

United States Office Action, U.S. Appl. No. 14/666,274, filed Jun. 1, 2016, twenty pages.

(Continued)

*Primary Examiner* — Azam Cheema
(74) *Attorney, Agent, or Firm* — Fenwick & West LLP (57) ABSTRACT

A topical search computer system identifies topics from various definitional (i.e., data) sources. The system generates a catalog of different topics from the data sources. Topics with similar names are differentiated by the system based on the context in which each topic is used. The context for a topic is represented by a context vector, which describes the co-occurrence relationships between the topic and other topics derived from the data sources. Because the system has computed a context for each topic, the system can provide improved search results responsive to user queries for information.

19 Claims, 5 Drawing Sheets

(56) References Cited

U.S. PATENT DOCUMENTS

| | | | |
|---|---|---|---|
| 8,990,200 B1* | 3/2015 | Christensen | G06F 17/30528 |
| | | | 707/723 |
| 9,607,047 B2* | 3/2017 | Christensen | G06F 17/30528 |
| 2002/0156793 A1 | 10/2002 | Jaro | |
| 2004/0225667 A1 | 11/2004 | Hu et al. | |
| 2006/0020473 A1* | 1/2006 | Hiroe | G10L 13/027 |
| | | | 704/275 |
| 2008/0215526 A1* | 9/2008 | Takagi | G06F 17/30796 |
| 2010/0077001 A1 | 3/2010 | Vogel et al. | |

OTHER PUBLICATIONS

United States Office Action, U.S. Appl. No. 12/896,700, filed Feb. 12, 2014, twenty-seven pages.
United States Office Action, U.S. Appl. No. 12/896,700, filed Mar. 15, 2013, twenty-one pages.
United States Office Action, U.S. Appl. No. 12/896,700, filed May 25, 2012, eighteen pages.

\* cited by examiner

TOPICAL SEARCH SYSTEM

CROSS-REFERENCE TO RELATED APPLICATIONS

This application is a continuation of co-pending U.S. application Ser. No. 14/666,274, filed Mar. 23, 2015, which is a continuation of U.S. application Ser. No. 12/896,700, filed Oct. 1, 2010 (now U.S. Pat. No. 8,990,200), which claims the benefit of U.S. Provisional Application No. 61/248,015, filed Oct. 2, 2009, the contents of each of which is incorporated by reference herein in its entirety.

TECHNICAL FIELD

The present invention generally relates to indexing and more particularly to indexing topics to improve processing of search queries.

SUMMARY

A topical search computer system identifies topics from various definitional (i.e., data) sources. The system generates a catalog of different topics from the data sources. The topics may describe famous people, sports teams, cities, current events, geographical sites, etc. For each topic, there may be other topics that have a similar name. For example, a single name (e.g., Brad Pitt) may be associated with two different people where each person is considered an individual topic. Topics with similar names are differentiated by the system based on the context in which each topic is used. The context for a topic is represented by a context vector, which describes the co-occurrence relationships between the topic and other topics derived from the data sources. In one embodiment, the context vector for a given topic comprises a set of a confidence values, each confidence value associated with the given topic and one other topic in the catalog. The confidence value is a figure of merit as to the quality of co-occurrences of two topics.

To determine a context vector for a topic, the system iterates over a set of sentences from retrieved documents such as web pages, and identifies each topic in the sentences. For a given topic in a sentence, the system creates a context vector that identifies other topics that co-occur in the sentences that include the given topic. Each other topic in the vector is assigned a confidence value indicating how related the topic is to the given topic based on how often the topic co-occurs with the given topic across the sentences, as well as syntactical relationships between the topic appearances. The confidence values for a given topic with respect to another topic are aggregated over all sentences. The topic confidence values in the context vector are normalized based on the highest confidence valued topic in the vector. The topics identified in the context vector are then ordered by their confidence values. As a result, for each topic there is topic context vector, with an ordered set of confidence values, with the topic having the strongest relationship to the given topic being ordered first.

Each topic's context vector may be used to disambiguate text (words) appearing the corpus. Given a text string and a set of topics that the text string could be referring to, the system can use the context vector of each topic as well as the context vector for the topics in the text surrounding the string to compute a score for each topic. The score describes a distance measure of the topics in the context to the topics discovered in the surrounding text. Given two (or more) potential topics, a word is disambiguated by associating with the topic having the closest distance measure to other topics appearing in the surrounding text.

Because the system has computed a context for each topic, the system can provide improved search results responsive to user queries for information. The system can perform a search based on topics appearing in a query, rather than simply keywords included in the query, the system is able to locate text related to a search topic even if the topic is not included in the located text. The context vectors can also be used to order the search results.

BRIEF DESCRIPTION OF THE DRAWINGS

FIG. 5 illustrates another user interface of a search result, according to one embodiment.

The figures depict a preferred embodiment of the present invention for purposes of illustration only. One skilled in the art will readily recognize from the following discussion that alternative embodiments of the structures and methods illustrated herein may be employed without departing from the principles of the invention described.

DETAILED DESCRIPTION

Figure 1:
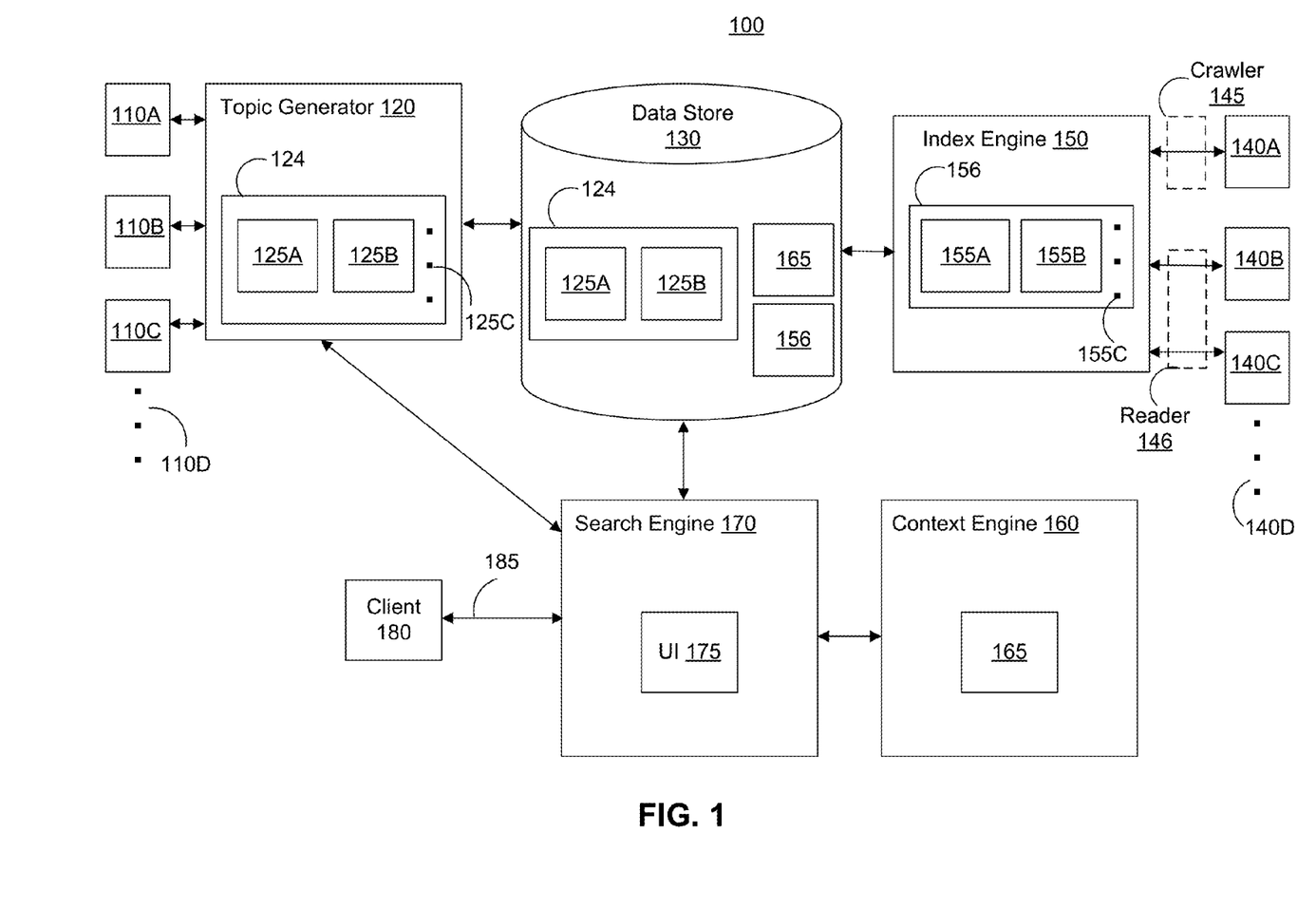
FIG. 1 illustrates an environment of a topical search system according to one embodiment.

FIG. 1 illustrates an environment 100 in which embodiments disclosed herein may be practiced. It will be appreciated that the environment 100 is only one of numerous example environments in which the embodiments disclosed herein may be practiced. Accordingly, the environment 100 is shown by way of example only and should not be used to limit the scope of the embodiments disclosed herein.

One of skill in the art will appreciate that environment 100 may include more or less than those shown in FIG. 1. In addition, although the various elements of environment 100 are shown as separate elements, this is for ease of illustration only. Two or more of the illustrated elements may be combined. Further, the elements of environment 100 may be distributed across multiple computing systems, may be located within a single computing system, or any combination thereof.

Note that the elements illustrated in environment 100 may communicate with one another via a network (not shown) which is typically the internet, but can also be any network, including but not limited to any combination of a LAN, a MAN, a WAN, a mobile, wired or wireless network, a private network, or a virtual private network. For example, in one embodiment a topical computer system comprising a topic generator 120, data store 130, search engine 180, index engine 150, and context engine 160. The topical search computer system may communicate with definitional sources 110, data 140 from various content sources such as web pages, and a client 180 via a network.

While only a single client 180 is shown, it is understood that very large numbers (e.g., millions) of clients are supported and can be in communication with the topical search system at any time. In one embodiment, the client 180 may include a variety of different computing devices, some examples of which are personal computers, digital assistants, personal digital assistants, cellular phones, mobile phones, smart phones and laptop computers.

Defining Topics

As shown, environment 100 includes definitional sources 110A, 110B, 110C, and potentially any number of additional definitional sources as illustrated by circles 110D. In general, the definitional sources 110 include various publically available data sources that may be used to define topics as will be explained in more detail. Examples of definitional sources include, but are not limited to, Wikipedia, Wiktionary, Freebase, and WordNet. In addition, publicly available social networking sources such as Facebook, Twitter, and MySpace may also serve as a definitional source 110. Further, any internet web site may also be a definitional source 110. It will be appreciated that non-publically available data sources may also be used as a definitional source 110 if they are accessible to other elements of the environment 100. Thus, any data source having a corpus of textual content may qualify as a definitional source 110.

The definitional sources 110 are accessed by a topic generator or parser 120 of the topical search computer system. In operation, the topic generator 120 is configured to search the information available in the definitional sources 110 to generate a catalog 124 of topics 125A, 125B, and potentially any number of additional topics as illustrated by circles 125C. The topics 125 may include any topic available in the world. As will appreciated, the topics 125 will generally include such topics as famous people, sports teams, cites, current events, geographical sites, science, medicine, and the like as these types of topics are most readily available in the definitional sources 110. However, as mentioned, any type of data that is available to the topic generator 120 may be added to the catalog 124 as a topic 125.

Having generated a topic 125, the topic generator 120 then uses the data from the definitional sources 110 to associate various information with the topic. For example, the topic generator 120 generates a unique identification for each topic. As will be explained in more detail to follow, the unique identification allows for topical searches of various data sources such as the internet. The topical generator 120 may also associate informational or biographical data with the topic. Further, the topic generator may determine one or more aliases by which the topic is known, one or more categories the topic may belong to, and one or more related topics that may be associated with the topic.

Figure 2:
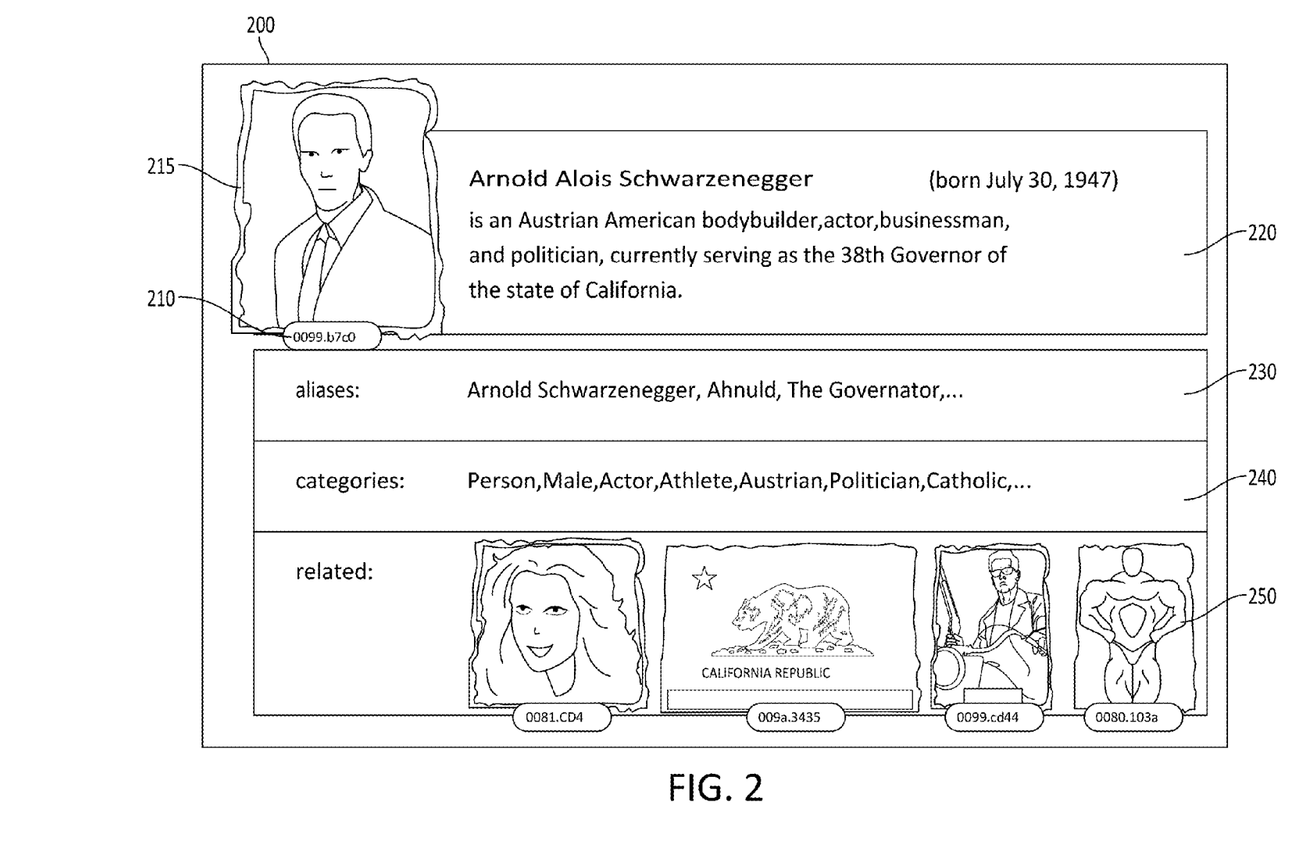
FIG. 2 illustrates a graphical example of a topic according to one embodiment.

FIG. 2 shows a graphical example 200 of a topic 125. As illustrated, the topic 200 is for current California governor, Arnold Schwarzenegger. As shown, an identification ("ID") 210 (e.g., 0099-b7c0) has been assigned to Arnold Schwarzenegger. In addition to the unique ID: 0099-b7c0, a picture 215 and informational or biographical data 220 are also associated with the topic. Further, there are the categories 240 that the topic Arnold Schwarzenegger belongs to, including Athlete, Austrian, Politician, and Actor. In addition, common aliases 230 for the topic including The Governator and Ahnuld as well as a set of precomputed related topics 250, in this case Maria Shriver, California, Terminator 2, and Bodybuilding have been associated with the Arnold Schwarzenegger topic. Note that each of the related topics also includes a unique identification that has been generated for that subject. As will be explained in more detail, the categories 240, common aliases 230, and/or related topics 250 may be used to help in performing a topical search.

Topical Indexing

Returning to FIG. 1, it is shown that environment 100 includes data 140A, 140B, 140C, and potentially any number of additional data as illustrated by circles 140D. The data 140 may include sentences from various content sources such as internet web sites and pages, Twitter feeds, RSS and other web feeds, email, blogs, and the like. In some embodiments, data 140 such as 140A from the internet or web sites may be discovered by a web crawler 145 that may be part of the topical search system. Likewise, the Twitter feeds, RSS and other web feeds, email, blogs, and the like may be discovered by a feeder or like program 146 that may be part of the topical search system. It will be appreciated that other commonly known programs for discovering data from various sources and databases may also be used. The collection of data 140 from one or more sources is also referred to as a corpus.

The data 140 is accessed by an index engine 150 that is part of the topical search system. The index engine 150 is configured to parse the text of the data 140 and divide the text so that each text item is associated with a topic 125 in topic catalog 124 stored in data store 130 that is part of the topical search system. In other words, topical indexing creates tuples 155 of topic IDs that identify the topics included in sentences. The discovered tuples 155 are stored in an index 156 in the data store 130.

For example, suppose a text string comprises the phrase Barack Obama won the election. The index engine 150 will first parse the text to determine the likely parts of speech contained in the sentence. In this example, the result of this parsing would be to determine that the sentence contains the following parts of speech:

1. Barack Obama—Proper Noun Phrase
2. won—Verb, Past Tense
3. the—Article
4. election—Noun The index engine 150 then identifies topics 125 in the data store 130 that match keywords in the sentence. In this case the index engine 150 matches the keyword "Barack Obama" to a President Barack Obama topic 125, having for example, a topic ID of 009b-f41d which is determined as previously explained above. The index engine 150 matches the keyword "won" to the verb win that has a topic 125 ID of 0004-4f8a. The index engine 150 also maps the election topic to the noun election with a topic 125 ID of 0002-2b43. From the sentence, the index engine 150 then creates the following tuple 155A:

[009b-f41d, 0004-4f8a, 0002-2b43]

which represents the set of topics {President Barack Obama, win, election}

This tuple is stored in the index 156 and is used when searching for topics in sentences. In one embodiment, a tuple represents a set of the topics included in a sentence.

For each topic ID that is stored in a tuple, the index engine 150 associates a topic confidence value that is based on the quality of the match between the text string in the sentence and name of the topic for that topic ID. Several factors are taken into account including capitalization of the string that matches the name of the topic, whether there's a match in parts of speech between the sentence sub-string that matched and the part of speech of the topic, how confident the system is of the source of the sentence, and in the case of ambiguity how closely the context of the topic matches the context of the sentence. A further description of the topic context and how it is used to disambiguate topics is provided below. With confidence values the tuple for Barack Obama won the election, becomes, for example:

[(009b-f41d, 0.93), (0004-4f8a, 0.98), (0002-2b43, 0.96)].

Context Generation

For any topic 125, there may be other topics that have a similar name or the like. For example, one topic 125 may be for the actor Brad Pitt, while another topic 125 may be for the Australian boxer Brad Pitt. As will be appreciated, a mechanism is needed to help determine which topic a user desires to search so that results associated with the wrong topic are not returned. Advantageously, the principles of the present invention provide such a mechanism by automatically determining the context for each topic. The context is represented by a context vector, which describes a list of topics that appear most frequently with the main topic, ordered by how frequently they appear.

Referring to FIG. 1, a context engine 160 that is included in the topical search system is configured to automatically generate a context vector 165 for each topic. The context vector 165 for a topic is generated in several steps.

First, the context engine 160 iterates over a collection of sentences from data 140. For each topic 125 found in a sentence 140, the context engine 160 creates a context vector. The context vector comprises a set of context confidence values, each one of these context confidence values expressing a relationship between the topic 125 and every (or at least a plurality of) other topic with which the topic 125 co-occurs in some sentence. Two topics are said to be associated with each other when they co-occur in some sentence.

Each context confidence value in the context vector for a given topic 125 is computed by multiplying the topic confidence value of the given topic 125 with the topic confidence value of the associated topic occurring in the sentence. As the context engine 160 finds the same topic 125 in multiple sentences, it inserts the associated topics and their topic confidence values to that topic's context vector. If the context engine 160 finds associated topics re-occurring in other sentences with a given topic 125, it adds the topic confidence value for the associated topics to the corresponding existing topic confidence values in the given topic's (125) context vector. In short, the context vector $CV_i$ for a topic i may be expressed as:

$$CV_i = \{T_{i,j}\}$$

where $T_{i,j}$ is the context confidence value for each topic j that co-occurs with topic i, and is the aggregated product of the topic confidence values $C_i$, $C_j$:

$$T_{i,j} = \Sigma(C_i * C_j)$$

over the set of tuples in which topic i and topic j co-occur.

Once the context engine 160 has completed iterating through the sentences 140 and finished creating context vectors for the topics 125 in the sentences, the context engine 160 iterates through all the topics 125 and their associated context vectors. For each topic the context engine 160 first sorts the context vector by the context confidence values $T_{i,j}$ for the associated topics in descending order. The first score in the context vector is therefore the highest context confidence value $T_{i,j(max)}$. The context engine 160 then normalizes the context confidence values in the context vector by dividing each confidence context value by the highest context confidence value $T_{i,j(max)}$. This way the first topic in any context vector will have a context confidence value of 1.00 and subsequent topics will have descending context confidence values. The context vector is then stored with the topic for later retrieval when a search is performed.

Returning to the examples of the topics Brad Pitt-actor and Brad Pitt-Australian boxer, Tables 1 and 2 below show the context confidence values of the topics that are associated with these two topics using the mechanism previously described. As can be seen, the topic that appears most frequently with the topic Brad Pitt-actor is the topic film while the topic that appears most frequently with the Brad Pitt-Australian boxer) is 2006 Commonwealth Games.

TABLE 1

Context Vector for topic Brad Pitt-actor

| | | |
|---|---|---|
| film (1.00) | Angelina Jolie (0.67) | George Clooney (0.37) |
| role (0.36) | movie (0.32) | Jennifer Aniston (0.28) |
| such (0.26) | Tom Cruise (0.24) | actors (0.23) |
| stars (0.22) | actor (0.21) | celebrities (0.20) |
| Cate Blanchett (0.20) | Matt Damon (0.20) | one (0.18) |
| first (0.17) | films (0.15) | other (0.13) |
| two (0.13) | Julia Roberts (0.12) | The Curious Case of Benjamin Button (0.12) |
| cast (0.12) | Robert Redford (0.11) | character (0.11) |
| time (0.11) | production (0.11) | Don Cheadle (0.10) |
| Leonardo DiCaprio (0.10) | David Fincher (0.10) | director (0.10) |
| Anthony Hopkins (0.10) | Meet Joe Black (0.09) | Mr. & Mrs. Smith (0.09) |
| Troy (0.09) | several (0.09) | children (0.09) |
| Plan B Entertainment (0.09) | Spy Game (0.09) | Interview with the Vampire (0.09) |
| Edward Norton (0.08) | Babel (0.08) | Harrison Ford (0.08) |
| Ocean's Eleven (0.08) | Legends of the Fall (0.08) | Academy Award (0.08) |
| celebrity (0.08) | The Assassination of Jesse James by the Coward Robert Ford (0.08) | Seven (0.08) |
| company (0.07) | opposite (0.07) | child (0.07) |
| many (0.07) | year (0.07) | Seven Years in Tibet (0.07) |
| Morgan Freeman (0.07) | same (0.07) | Will Smith (0.07) |
| magazine (0.07) | daughter (0.07) | name (0.07) |
| part (0.07) | Madonna (0.07) | Fight Club (0.07) |
| others (0.07) | 12 Monkeys (0.07) | Sean Penn (0.06) |
| project (0.06) | Johnny Depp (0.06) | star (0.06) |
| best (0.06) | Eric Bana (0.06) | show (0.06) |
| relationship (0.06) | Kalifornia (0.05) | David Beckham (0.05) |
| Benicio del Toro (0.05) | baby (0.05) | performance (0.05) |
| The Mexican (0.05) | Hollywood | Los Angeles |
| California (0.05) | Kirsten Dunst (0.05) | Paramount Pictures (0.05) |
| Jesse James (0.05) | producer (0.05) | Catherine Zeta-Jones (0.05) |
| Juliette Lewis (0.05) | work (0.05) | young (0.05) |
| birth (0.05) | due (0.05) | Craig Sheffer (0.05) |
| video (0.04) | Bruce Willis (0.04) | Kevin Spacey (0.04) |
| Rusty Ryan (0.04) | Cameron Diaz (0.04) | Gael Garcia Bernal (0.04) |
| Fight Club (0.04) | scene (0.04) | major (0.04) |

TABLE 2

Context for Brad Pitt the Australian Boxer

| | | |
|---|---|---|
| 2006 Commonwealth Games (1.00) | first (0.90) | 2008 Summer Olympics (0.71) |
| lbs (0.69) | eventual (0.69) | local (0.69) |
| bout (0.69) | winner (0.69) | Melbourne (0.49) |
| Australia (0.43) | Deontay Wilder (0.43) | Emmanuel Izonritei (0.43) |
| Gladstone | Queensland (0.43) | RSCO (0.43) |
| boxer (0.38) | qualifier (0.35) | 16 (0.34) |
| favorite (0.34) | amateur (0.34) | national (0.34) |
| 12 (0.34) | 25 (0.34) | rival (0.34) |
| works (0.34) | plumber (0.34) | semifinal (0.34) |
| Australian (0.34) | defeated (0.34) | 13 (0.34) |
| 11 (0.34) | nationals (0.31) | American (0.30) |
| Olympic (0.30) | Australia (0.30) | heavyweight (0.27) |
| gold (0.27) | Awusone Yekeni (0.27) | Harpreet Singh (0.27) |
| Daniel Beahan (0.27) | Danny Price (0.27) | Blairgowrie |

TABLE 2-continued

Context for Brad Pitt the Australian Boxer

| | | |
|---|---|---|
| Victoria (0.27) | March 6 (0.25) | hard-hitting (0.21) |
| final (0.21) | round (0.21) | Tennis strategy (0.20) |
| Hollywood (0.18) | hero (0.17) | Scot Steven Simmons (0.09) |
| James Wasao (0.05) | Kristi Foote (0.05). | |

Topic Disambiguation

The context vector for a topic can be used to disambiguate topics. Given a text string and a set of topics to which the string could be referring, the context engine 160 can use the context vector of each topic and the topics in the text surrounding the text string to compute a score for each topic. The score is essentially a distance measure of the topics in the context to the topics discovered in the surrounding text.

For example, suppose the context engine 160 is presented with the following text:

Brad Pitt won a gold medal at the 2006 Commonwealth games.

As discussed above, the text string "Brad Pitt" can map to the topic Brad Pitt-actor, or Brad Pitt-Australian boxer. The context vector for Brad Pitt-Australian boxer will generate a higher score than the context vector for Brad Pitt-actor, because there are several topics in the context as shown in Table 2 that match the surrounding text of the string 'Brad Pitt'. These topics are 2006 Commonwealth Games, gold, won. By using the score it can discovered that it is more likely that the topic referred to by the string 'Brad Pitt' is Brad Pitt-Australian boxer rather than Brad Pitt-actor. In one embodiment, to determine the score, a simple "count" is maintained of the number of terms in the text string that are included in the candidate context vectors. Alternatively, a dot product may be computed between each candidate topic's context vector and context vectors for the other topics included in the search string.

Searching

Attention is again made to FIG. 1, where a search engine 170 of the topical search computer system is illustrated. The search engine 170 acts as the front end for the searching system and receives a search query 185 from a client 180. The search engine 170 may include a user interface (UI) 175 that facilitates searching. In addition, the search engine is configured to access the functionality of the other elements of environment 100 when performing searches. Thus, the client 180 can use the search engine 170 to find documents that contain a particular topic.

For example, suppose a user uses the client 180 to search for sentences that match "Pres. Obama." The topic 125 ID associated with the keyword "Pres. Obama" is determined to be 009b-f41d as previously described. The search engine 170 will then find sentences that have been indexed by index engine 150 that include that ID, including the example sentence discussed above of "Barack Obama won the election." It will be noted that a match was made even though there is not an exact match on the keywords "Pres. Obama" and "Barack Obama."

As another example, the user 180 may use the Arnold Schwarzenegger topic that was discussed above in relation to FIG. 2. By choosing the Arnold Schwarzenegger topic, the user 180 is able to find documents that reference that topic, whether or not the string "Arnold Schwarzenegger" actually occurs in the document. For example, search engine 170 may be able to match a tweet with the text "The Governator signed the tax bill yesterday." The reason search engine 170 can do this is that rather than searching for the string "Arnold Schwarzenegger," the search engine 170 searches for the unique topic ID shown in FIG. 2. When creating the index 155, the string "The Governator" is recognized as the Arnold Schwarzenegger topic and is indexed using the Arnold Schwarzenegger topic ID as previously described.

As will be appreciated, topical searching provides advantages over traditional search engines. For instance, a traditional search engine would only search for the string "Arnold Schwarzenegger" and would thus miss the text "The Governator signed the tax bill yesterday" as the string "Arnold Schwarzenegger" does not appear in this text. Because the topical search system performs a search based on topics rather than merely on the keywords included in a search query, it is able to find text related to the search topic (the keywords) even if the actual topic name is not included in the resulting article.

Figure 3:
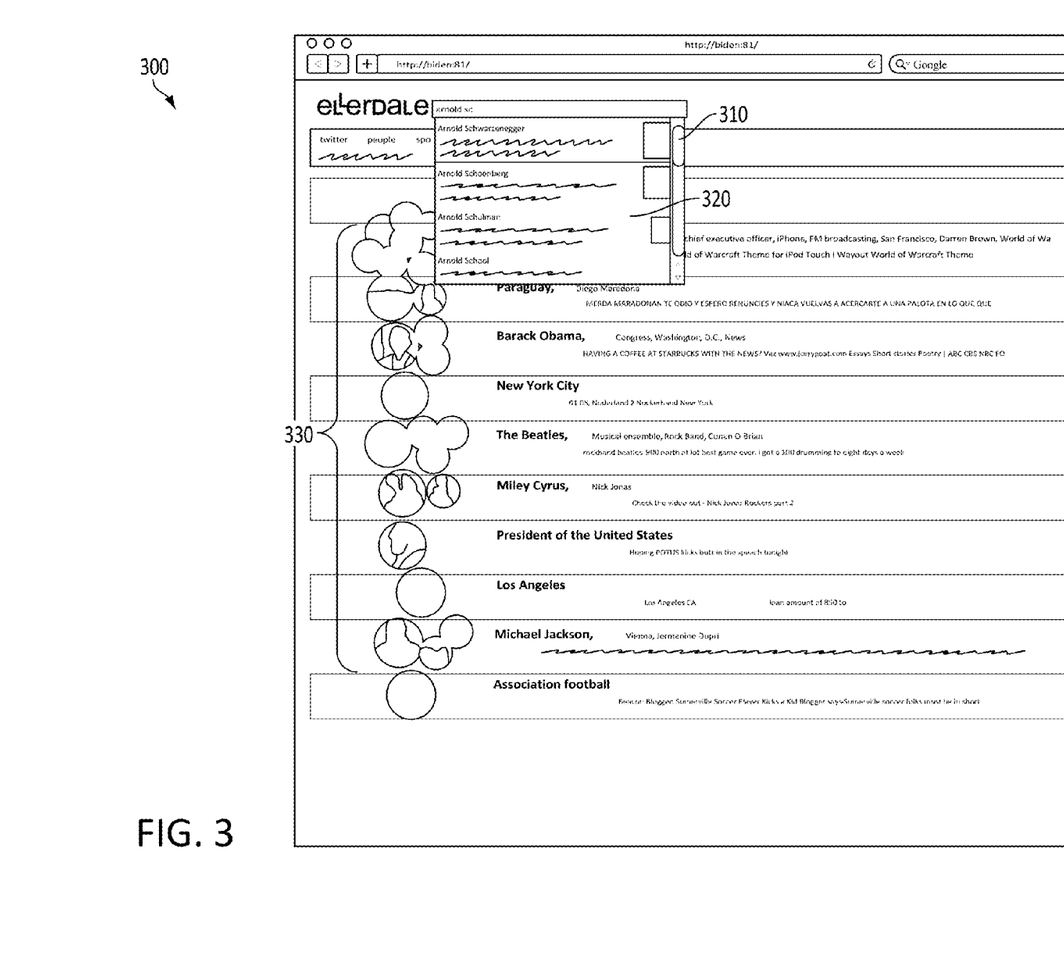
FIG. 3 illustrates a front end user interface for performing searches for information, according to one embodiment.

One way that the user 180 can search a topic is to use a drop down menu. For example, FIG. 3 shows an example 300 of the UI 175. As shown, a search query window 310 allows the user 180 to insert a desired search query, such as "arnold sc." A drop down window 320 shows various topics that may match the search query, with Arnold Schwarzenegger being the first on the list.

Related Topics

As mentioned in relation to FIG. 2 above, the topic generator 120 included in the topical search system is configured to determine related topics for each topic 125. The system operates on the premise that topics in a sentence are related to each other. While the system may not know the exact nature of the relation of the topics, the fact that they appear in the same sentence is useful for purposes of determining that a topic has something to do with another topic. For example, from the sentence: "Mary and William were married in Tacoma, Washington," it can be inferred that the topics Mary, William, marriage, Tacoma, and Washington are related. Relations between topics can be computed for a number of sentences to help identify which topics are more closely related to each other. For example, the topics Prime Minister and Winston Churchill will appear together in many sentences and therefore it can be concluded that Prime Minister is closely related to Winston Churchill.

The following method is used by topic generator 120 and/or search engine 170 to determine related topics to a search query topic. The first step is to identify the sentences in which the query topic appears. Each topic in the system may be identified by more than one name as previously described. Each sentence in the system is indexed by the topics that are part of the sentence, regardless of the name that may have been used for the topic in the sentence as also previously described. In addition to multiple names, a topic can also be identified by an anaphora. For example, "Albert Einstein," in addition to "Dr. Einstein," "Albert," or "Prof Albert Einstein," could in a particular sentence be identified by the pronoun "he."

In order to facilitate the computation the system preprocesses the sentences in the system in order to compute for each sentence which topics are referenced in the sentence. Each topic in the system has the unique topic ID such as the ID 210. Each sentence similarly has a unique sentence ID. For each sentence, there is stored a set of topic IDs that are referenced in the sentence. A reverse index of topic IDs to sentence IDs is then created.

For a given a query topic, the reverse index can be used to quickly identify the sentences in which that particular query topic appears. This first step is referred to as the Reverse Index step of the method.

The second step in the method is to identify which topics co-occur with the query topic in identified sentences. This is done by iterating over each sentence identified by the first step and collecting all the topics in those sentences. As the topics are collected, they can be ordered by how often they occur. This step is referred to as the Forward Index step of the method.

For example, suppose the query "General Relativity" is searched. In the first step the system identifies the topic ID(s) corresponding to the query string. The reverse index is then used to identify which sentence ID(s) contain the General Relativity topic. In this case assume that there are several hundred sentences that refer to General Relativity.

In the second step the system iterates over the sentences identified in step one and collect the topics, ordering by how many sentences they appear in. The topic that appears in the most sentences with General Relativity turns out to be the topic Albert Einstein. The system can then determine that the topic most closely related to the topic General Relativity is Albert Einstein.

Figure 4:
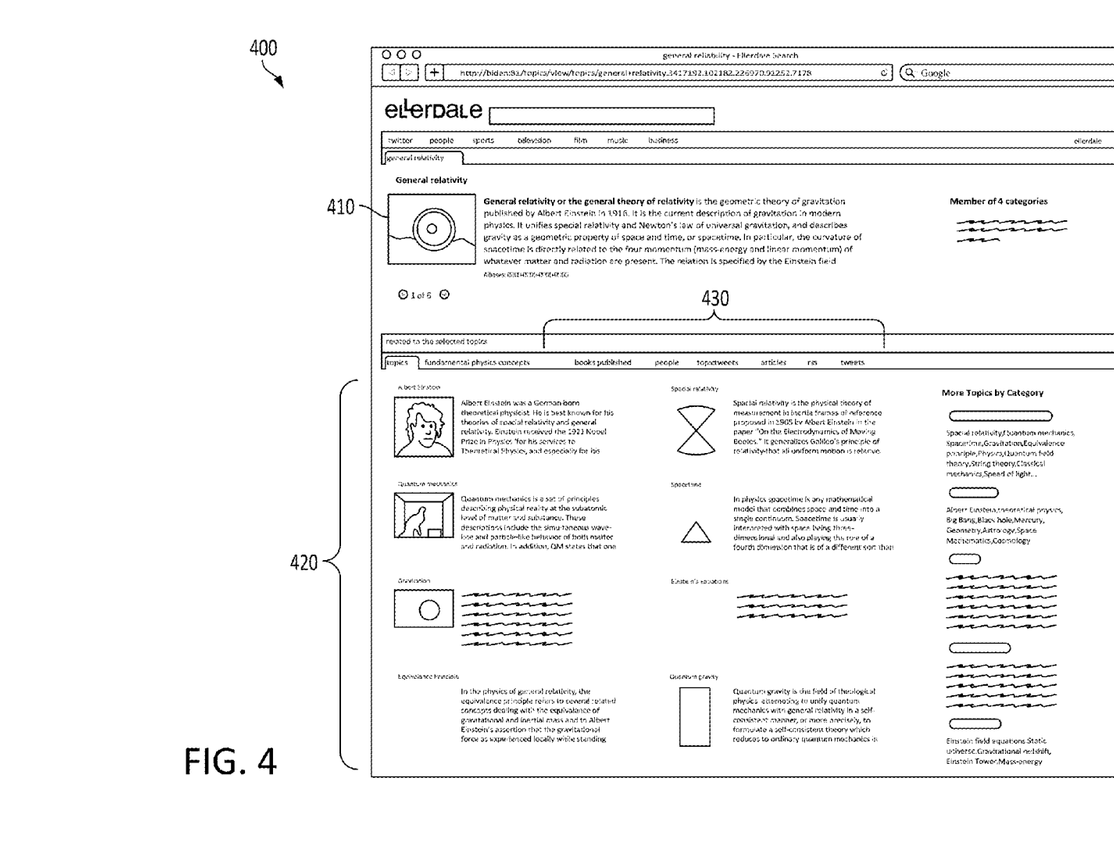
FIG. 4 illustrates a user interface of a search result, according to one embodiment.

FIG. 4 illustrates an example 400 of the UI that shows this result. As shown the topic 410, which is General Relativity, is shown along with informational data derived from the definitional sources 110 as previously described. As also illustrated, the UI shows the related topics to general relativity that were found by the method previously described. As shown, Albert Einstein is listed first as being the most related topic. The UI also includes the information data derived from the definitional sources 110 for each of the related topics. Advantageously, this allows the user 180 to quickly access information about several topics related to the desired topic of general relativity.

As further illustrated in FIG. 4, the UI may also include other useful information for the client 180. For example, the links 430 provide a quick way for the user to switch to other general information categories that may include information about general relativity. These include book subjects, people, physics concepts, and the other subjects listed. The user of client 180 may select one of these and a similar UI would appear with related topics. For example, if the people link was selected, then the people most related to general relativity would be shown.

Organizing Search Results

Referring again to FIG. 1, the search engine 170 is configured to organize data that has been found by the topical search is advantageous in several ways that traditional search engines are not able to do. That is, the search engine 170 organizes the search results by topic, which is particularly advantageous for the real-time web such as Tweets and RSS feeds.

For example, suppose that the search query is "Arnold Schwarzenegger" and the system finds 100,000 tuples related to "Arnold Schwarzenegger" while searching the indexed data 140. The search engine 170 may then analyze the data to see if there are any trends in the data. In other words, the search engine 170 can determine what topics are most commonly being associated with the search query topic. For instance, the most commonly associated topics may be forest fires and budget crises as these are topics currently relevant to events in California. Accordingly, the search engine 170 may organize the search results so that those related to forest fire are in one category, those related to budget crises are in another category, and those not related to either are in a third category. The UI 175 may then be configured to list the search results by these categories. It will be appreciated that the use of three categories is for illustration only and is not limiting.

It will also be appreciated that the ability to determine what is the most current relevant topics associated with a query topic is very useful for the real-time web. Since the data on the real-time web is rapidly changing, the ability to quickly find topics and related topics is useful. In addition, a searcher interested in what types of topics the general public was for example tweeting about, would be able to use the system of the present invention to quickly determine this. A traditional search engine, on the other hand, does not have this ability to determine what is currently the most relevant topic. Rather, the traditional search engine would look for data related to the search topic and return what was found regardless of age or topic.

Another useful feature of the present invention is the ability to analyze the data 140 and determine what topics are most popular at a given time. This information can then be presented to the user 180. For example, referring to FIG. 3, the UI 300 shows the top 10 trending topics 330 being discussed on Twitter at that point in time. The user 180 may click on a link next to one of the top 10 topics and be taken to more information about the selected topic.

The search engine 170 may organize search results, especially real-time results based on the category of a topic. Given a search result, e.g. a set of web pages, RSS articles or tweets, it is possible to organize the results by the topics that appear in those results. For example, a search result for "digital cameras" in tweets could yield the results seen in FIG. 5.

The system sorts the topics by the number of tweets that refer to a "digital camera" in question. This generates a list of all digital cameras currently being tweeted about. This is accomplished first by searching for all the tweets that contain topics that belong to the digital camera category. Then, for each of those tweets, the system pulls out those topics and keep track of how many times that topic is encountered in the result set of tweets. Finally, the system sorts those topics by the number of tweets that contained that topic.

As shown in FIG. 5, the UI 500 shows the camera topic and information about the topic as shown at 510. The data has been sorted as explained and it has been determined that for all cameras, the Nikon D60 is the most tweeted about at the point in time. The next most tweeted about camera is the Nikon D90 and so as illustrated. The UI also includes example tweets 530 for each camera and the number of tweets. Again, as will be appreciated, traditional search engines do not have the ability to find data in this manner.

Additional Considerations

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic (i.e., computer executable) instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A method comprising:
   identifying a set of topics appearing in text strings included in a plurality of data sources;
   associating each topic with a context vector, each context vector representing a frequency of a given topic co-occurring in one or more text strings with a plurality of topics from the set of topics and comprising:
   a plurality of context confidence values, each context confidence value representing a relationship between a given identified topic and an additional identified topic that co-occurs within a text string from the plurality of data sources with the given identified topic; and
   where each context confidence value of the plurality of context confidence values is based upon a combination of a topic confidence value of the given identified topic and a topic confidence value of the additional identified topic that co-occurs within the text string from the plurality of data sources with the given identified topic;
   receiving a search query comprising a keyword;
   identifying one or more topics associated with the keyword included in the search query;
   identifying one or more text strings from the plurality of data sources that include one or more of the topics associated with the keyword included in the search query; and
   generating a search result for the search query that includes the identified text strings.

2. The method of claim 1, further comprising:
   sorting the identified text strings according to topic, wherein the generated search result comprises the sorted identified text strings.

3. The method of claim 1 wherein the search result comprises a plurality of topic categories, each category associated with an identified topic associated with the keyword.

4. The method of claim 1, further comprising:
   maintaining, in a database, a reverse index of text strings that relates each topic to a text string from the plurality of data sources in which the topic occurred.

5. The method of claim 4, wherein identifying one or more text strings from the plurality of data sources that include one or more of the topics associated with the keyword included in the search query comprises:
   searching the reverse index of text strings using the one or more topics associated with the keyword included in the search query; and
   identifying text strings related to one or more topics associated with the keyword included in the search query.

6. The method of claim 5, wherein each of the identified text strings has at least one other topic that co-occurs with at least one of the topics associated with the keyword included in the search query.

7. A method comprising:
   identifying a set of topics appearing in sentences included in a plurality of data sources;
   associating each topic with a context vector, each context vector representing a frequency of a given identified topic associated with a topic identifier co-occurring in one or more text strings with a plurality of topics from the set of topics and comprising:
  a plurality of context confidence values, each context confidence value representing a relationship between the given identified topic and an additional identified topic that co-occurs within a sentence from the plurality of data sources with the given identified topic; and
  where each context confidence value of the plurality of context confidence values is based upon a combination of a topic confidence value of the given identified topic and a topic confidence value of the additional identified topic that co-occurs within the sentence from the plurality of data sources with the given identified topic;
receiving a search query comprising a keyword;
identifying one or more topics associated with the keyword included in the search query;
identifying one or more sentences from the plurality of data sources that include one or more of the topics associated with the keyword included in the search query; and
generating a search result for the search query that includes the identified sentences.

8. The method of claim 7, further comprising:
sorting the identified sentences according to topic; and
wherein the generated search result comprises the sorted identified sentences.

9. The method of claim 7, wherein generating the search result comprises:
identifying topics that are commonly associated with the keyword; and
including the identified topics that are commonly associated with the keyword in the search result.

10. The method of claim 9, wherein the search result comprises a plurality of topic categories, each category associated with an identified topic that is commonly associated with the keyword in the search result.

11. The method of claim 7, further comprising:
maintaining, in a database, a reverse index of sentences that relates each topic to a sentence from the plurality of data sources in which the topic occurred.

12. The method of claim 11, wherein identifying one or more sentences from the plurality of data sources that include one or more of the topics associated with the keyword included in the search query comprises:
searching the reverse index of sentences using the one or more topics associated with the keyword included in the search query; and
identifying one or more sentences related to one or more topics associated with the keyword included in the search query.

13. The method of claim 12, wherein each of the identified sentences has at least one other topic that co-occurs with the one or more topics associated with the keyword included in the search query.

14. A computer program product comprising a non-transitory computer readable storage medium having instructions encoded thereon that, when executed by a processor, cause the processor to:
identify a set of topics appearing in text strings included in a plurality of data sources;
associate each topic with a context vector, each context vector representing a frequency of a given topic co-occurring in one or more text strings with a plurality of topics from the set of topics and comprising:
  a plurality of context confidence values, each context confidence value representing a relationship between a given identified topic and an additional identified topic that co-occurs within a text string from the plurality of data sources with the given identified topic; and
  where each context confidence value of the plurality of context confidence values is based upon a combination of a topic confidence value of the given identified topic and a topic confidence value of the additional identified topic that co-occurs within the text string from the plurality of data sources with the given identified topic;
receive a search query comprising a keyword;
identify one or more topics associated with the keyword included in the search query;
identify one or more text strings from the plurality of data sources that include one or more of the topics associated with the keyword included in the search query; and
generate a search result for the search query that includes the identified text strings.

15. The computer program product of claim 14, wherein the non-transitory computer readable storage medium further has instructions encoded thereon that, when executed by the processor, cause the processor to:
sort the identified text strings according to topic, wherein the generated search result comprises the sorted identified text strings.

16. The computer program product of claim 14, wherein the search result comprises a plurality of topic categories, each category associated with an identified topic associated with the keyword.

17. The computer program product of claim 14, wherein the non-transitory computer readable storage medium further has instructions encoded thereon that, when executed by the processor, cause the processor to:
maintain, in a database, a reverse index of text strings that relates each topic to a text string from the plurality of data sources in which the topic occurred.

18. The computer program product of claim 17, wherein identify one or more text strings from the plurality of data sources that include one or more of the topics associated with the keyword included in the search query comprises:
search the reverse index of text strings using the one or more topics associated with the keyword included in the search query; and
identify text strings related to one or more topics associated with the keyword included in the search query.

19. The computer program product of claim 18, wherein each of the identified text strings has at least one other topic that co-occurs with at least one of the topics associated with the keyword included in the search query.

* * * * *